United States Patent [19]

Stemmle

[11] 4,050,816
[45] Sept. 27, 1977

[54] DOCUMENT HANDLING SYSTEM

[75] Inventor: Denis J. Stemmle, Williamson, N.Y.

[73] Assignee: Xerox Corporation, Stamford, Conn.

[21] Appl. No.: 701,371

[22] Filed: June 30, 1976

[51] Int. Cl.$^2$ .................... G03B 27/62; B65H 5/02; B65H 5/04

[52] U.S. Cl. .................................. 355/75; 271/272; 355/50

[58] Field of Search ............... 355/75, 50, 51, 64, 355/66; 271/64, 199, 272

[56] References Cited

U.S. PATENT DOCUMENTS

| | | | |
|---|---|---|---|
| 2,719,714 | 10/1955 | Pratt et al. | 355/66 X |
| 3,452,981 | 7/1969 | Benjamin | 271/199 X |
| 3,960,447 | 6/1976 | Sather | 355/75 |
| 3,963,345 | 6/1976 | Stemmle et al. | 355/50 |

Primary Examiner—Richard A. Wintercorn

[57] ABSTRACT

An automatic document handling system for copying documents in a pre-collated recirculation manner with minimal document handling to provide pre-collated output copy sets. The documents may be loaded manually in a cassette unit removed from a xerographic copier. The cassette unit comprises two document retaining webs commonly wound on two scrolls. The documents are retained on a first web at all times. The second web separates from the first web only in the optical imaging area so as to allow unobstructed exposure of the documents. The second web separates by forming a loop around the scrolls from separating rollers at opposite sides of the imaging area, and winds up on one scroll as it is unwound from the other scroll. Positive document retention is provided by the second web even though the first web is outside wound.

10 Claims, 1 Drawing Figure

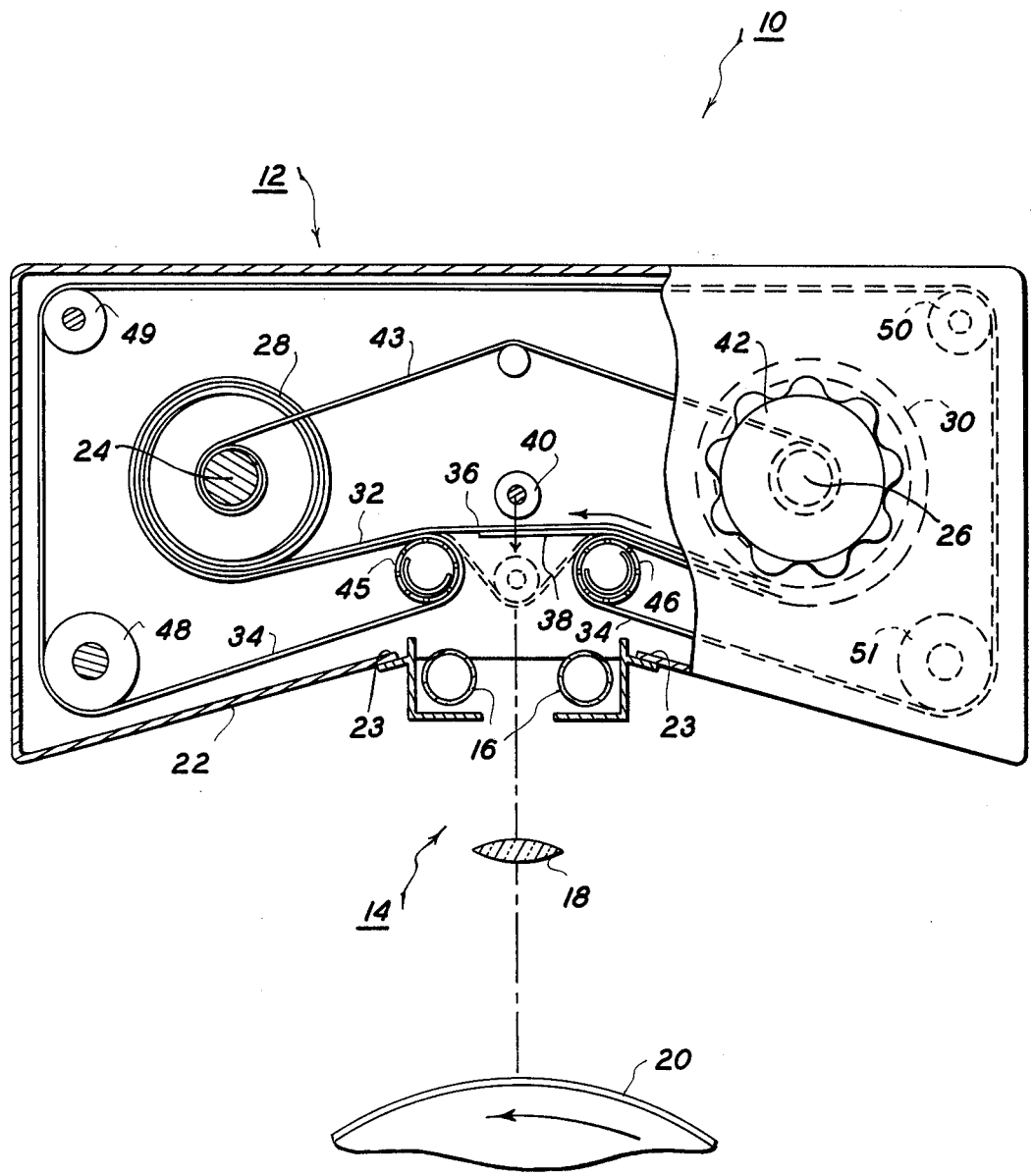

DOCUMENT HANDLING SYSTEM

This application is related to a commonly assigned U.S. Pat. No. 4,008,956, issued Feb. 20, 1977, filed Mar. 24, 1975, by the same Denis J. Stemmle entitled, "Pre-collation Copying". The disclosure thereof, and the prior art references cited therein, are incorporated by reference in this application. The Commissioner's notice of May 19, 1975, published June 17, 1975, is noted. Common subject matter with the above-referenced application is also disclosed in U.S. Pat. No. 3,963,345, issued June 15, 1976, to the same Denis J. Stemmle, together with Morton Silverberg, and filed on the same date.

The present invention relates to document copying systems, and more particularly to a web-scroll document handling system for providing collated copy sheet sets with minimized document handling.

When multiple copies are made from a multi-page set of original documents, the multi-page copies thereof must be separated into separate copy sets in proper order, which is known as collation. For example, for 10 copies of a five page document set the copies should end up in ten separate copy sets, each copy set having one copy of pages 1 through 5 therein, in that order. Once the copies are collated into copy sets they can then be stapled, bound, or otherwise finished. Such a copy set may be a copy of a multiple page memo, report, brief, magazine, book, etc.

The collation of multiple copy sets is known to be performable manually or automatically, in two general ways. In one way, which may be called "post-collation", the original document pages need only be handled once for copying. All of the desired number of copies are made in one copying operation from each document page. The copies thus come out of the reproducer in uncollated form, e.g., 10 copies of page 1 together, followed by 10 copies of page 2, etc. The post-collation can then be provided in a number of well known ways by mechanical sorters or collators, which separate the copy pages into separate copy set bins. Each copy sheet of a given document page must be individually placed in a separate bin. Then the copy of the next document page must be placed adjacent the preceding copy page in each bin until a copy set is completed in each bin. For such post-collation copying the documents may be automatically serially advanced for copying in a single pass, i.e, without recirculation of the set of documents. It is known to copy documents on a web or webs or from a scroll for such copying, e.g., U.K. Pat. No. 1,111,875, to VEB Reprotechnik Leipzig, and U.S. Pat. Nos. 2,719,714 and 3,452,981.

The conventional post-collation process has a number of disadvantages. It requires considerable mechanical handling of the copy sheets, with consequent potential jams and copy sheet loses. The sorters or collators require considerable space, weight, and expense in order to provide a sufficiently large capacity. A conventional sorter or collator has a maximum copy set capacity limited to the number of its bins. Thus, a conventional single 20 bin sorter can only collate 20 copy sets at a time. To make additional copy sets conventionally all the bins are unloaded after the first copying run is completed and another run is made. Also, the maximum size of the copy sets, including the maximum number of copy sheets which can be in each copy set, is limited by the size of the individual bins.

It is known that the use of sorters or collators can be completely avoided by "pre-collation", a different way of performing output collation. In pre-collation the originals are serially recirculated, and one copy made per page per recirculation, by the number of times corresponding to the number of copies desired. Thus, the copy sheets come out of the reproducing apparatus individually, but already pre-collated into order, i.e., in sets. Another term for a pre-collation system is a "document recirculation system", since the documents must be recirculated in some manner in order to allow their repeated sequential copying. Stating it another way, one copy at a time is made from the originals, one original page at a time, in forward or reverse page sequence, until the original document set has been fully copied. Then this copying sequence of the document set is repeated by the number of times corresponding to the desired number of copies of the document set. Thus, for the exemplary 10 copies of a 5 page book, one copy at a time would be made of each document page in this order: pages 1, 2, 3, 4, 5; 1, 2, 3, 4, 5; etc. repeated a total of ten times to make 10 copy sets. For bi-directional pre-collation copying the document copying sequence would be 1, 2, 3, 4, 5; 5, 4, 3, 2, 1; 1, 2, 3, 4, 5, etc.

With pre-collation copying, there is no limit on the number of copy sets. The size of each copy set is limited only by the document page capacity of the document recirculation system. The completed sets can be removed from the output tray and proofed or finished while the others are still being produced. On-line finishing can be provided in which each copy set is bound while the next set is being produced.

In the automatic document handling system for making pre-collated copy sets disclosed herein, and in more detail in the above-cited parent application, the repeated collated imaging of a set of original documents is provided by placing and retaining the documents on an elongate windable document holding web. This web is bound between two spaced web scrolls positioned and wound so as to retain the document between the turns of the web scrolls on both of the scrolls. The web is repeatedly wound and unwound from one scroll to the other (recirculated) to repeatedly expose individual documents on the web in a exposed portion of the web extending between the scrolls. The documents are optically exposed on the web between the scrolls for copying, and a simple optics arrangement may be utilized.

The documents in the presently disclosed system need not contact any other object than the retaining web itself and are held between the layers of the web scroll. They need not be adhesively or otherwise mechanically fastened to the web. Thus, there is no substantial relative motion required at any time between a document sheet and any other object, even during recirculation. This reduces the danger of document damage greatly.

In the disclosed system, the advantages of manual initial document placement can be provided. Yet once the documents are placed on the web, all of the subsequent recirculations of the documents for pre-collation copying may be accomplished by the system itself without manual intervention. Further, the unloading of the documents can also be automatically accomplished. Thus, all of the advantages of pre-collation copying noted above can be provided, yet without minimization of document handling disadvantages. Further, the present system is readily compatible with various automatic separating and loading systems, and only a single document separating and loading operation need be performed on each document regardless of the number of copies.

As noted above, the size of individual pre-collated copy sets is limited only by the document capacity of the recirculation system. With the system disclosed herein a large number of documents can be recirculted. This number is limited only by the desired or practical maximum dimensions of the web scrolls.

An exemplary embodiment of the present invention is shown and described hereinbelow as incorporated into an otherwise conventional exemplary xerographic copying apparatus and process. Accordingly, said known xerographic apparatus and process need not be described in detail herein, since various printed publications, patents, and publicly used machines are available which teach such details thereof to those skilled in the art.

The present invention particularly relates to a document handling system of the subject type in which an additional document web is provided for additional retention of the documents between different webs in a desired orientation, but in which the document is fully exposed for copying on only one web, without exposure through any webs, and therefore without optical interference or image contamination from scratches or contaminants on any web.

Further objects, features and advantages of the present invention pertain to the particular apparatus, steps, and details whereby the above-mentioned aspects of the invention are attained. Accordingly, the invention will be better understood by reference to the following description and to the schematic drawings forming a part thereof, which are approximately to scale except where otherwise noted, and wherein:

The FIGURE is a side view of a xerographic copying system with an exemplary document handling system in accordance with the present invention.

Referring now to the FIGURE, there is illustrated therein one example of the present invention. It will be appreciated that subject document handling systems may have different orientations and combinations with different exemplary xerographic (or other electrostatographic) copying systems, and different output arrngements. For example, the present invention may also be utilized with the other embodiments disclosed in the above-cited parent application.

In the FIGURE there is shown a document handling system 10 comprising a cassette unit 12 in which the documents are loaded, contained, and exposed for copying. The cassette unit 12 is removable as an integral unit from the copier and may be separately loaded and then inserted into the xerographic copier subsequently for copying the pre-loaded documents. The cassette unit 12 is inserted into the copier in the optical path of a conventional optics system 14 integral the copier including the exposure lamp 16 and a lens 18. The lens 18 focuses the scanned strip image of the documents being moved inside the cassette unit 12 onto a xerographic photoreceptor 20 for the production of copies of the documents.

The cassette unit 12 has a frame 22 including a mounting area 23 providing an opening in the cassette frame 22 for the mounting of the cassette unit 12 into the copier apparatus exposure area for the documents. The cassette frame 22 also provides the mounting for the spaced scroll axes 24 and 26 on which are rotatably mounted web scrolls 28 and 30. The scrolls 28 and 30 are formed by the convolute winding of a first web 32 and a second web 34 thereon. The first web 32 has an intermediate segment 36 extending between the two scrolls 28 and 30. An exemplary document 38 is shown on the intermediate segment 36 being exposed to the optics system 14 for copying.

Also illustrated selectively operating on the intermediate segment 36 is a movable unloading roller 40 to arcuately deform it for unloading of documents therefrom automatically by beam stripping. The roller 40 is shown in its normal non-engaging position allowing copying of the documents on a planar web intermediate segment 36. The movement arrow and the dashed line portion of the roller 40 and the intermediate segment 36 indicate their respective document unloading positions when the roller 40 is deforming the web 32.

A hand wheel 42 is shown connecting to one of the two scrolls to allow for manual movement of the document retaining webs. A scroll tensioning means 43, such as a negator spring strip or the like, is shown interconnecting the two scrolls 28 and 30 to maintain tension therebetween so as to maintain tension of the webs for document retention.

As in the above-cited parent application, the documents are loaded upon, and automatically recirculated by, an elongate windable document holding web 32, and means are provided for forming a spaced pair of oppositely wound scrolls from this web for winding up the documents loaded onto the web into these scrolls. The documents are retained between the turns of the web on both of the scrolls during the copying operation. Appropriate or conventional drive means are provided for recirculating winding and unwinding the web between one web scroll and the other so as to recirculatingly expose, in sequence, the individual documents on the web as they appear on the unwound intermediate web segment. The documents are thereby exposed in the pre-collated order in which they are loaded onto the web, and then in the inverse order, and then again in the same order, and thus correspondingly pre-collated copy sets can be produced by the recirculations between the scrolls. As the documents are loaded they are wound up on the web into one of the scrolls so that the documents are trapped between the web layers of the scroll. Likewise, when the web is recirculated onto the other scroll the documents may be retained in position solely by being held between the layers of the other scroll. The documents may each be exposed as they are being loaded to provide a "proof set".

In the exposed intermediate web segment bewween the scrolls the documents may be held in position on the web by providing a web with an air permeable structure and by providing a vacuum platen and a vacuum chamber on the opposite side of the web from the document retaining side. The porous web and the exposed document thereon are thereby held against the vacuum platen within the span region of the web between the scrolls. The retaining of the documents on the web in the exposed inter-scroll segment is also associated by providing a substantially linear and planar configuration of the web between the two scrolls.

The scrolls 28 and 30 illustrated here are oppositely wound or convoluted and allochiral. The intermediate segment 36 of the web 32 forms a document retaining nip on its non-document retaining side with each of the scrolls where the web winds into the scrolls, i.e., both of the nips are on the non-document retaining side of the web. Both of the scrolls are wound on the non-document retaining side of the web. Expressing it another way, both scrolls are outside wound. However, with the additional web 34 provided here the documents are maintained on the first or main web 32 on its document retaining side continuously, and the documents are maintained only in a convex orientation on both of the scrolls (convex relative to the side of the documents being imaged).

Referring to the document retaining web, one example is a thin, flexible, but substantially non-stretching Mylar plastic or other suitable web material, highly perforated over its major central portion to render it air permeable. Its outer edges, at each side thereof, may be driven by driven friction rollers (not shown). The surface of the web provides a high friction surface relative to the document to prevent document movement or sliding on the surface of the web.

At the completion of document loading here all of the documents will have been wound up into one scroll and be retained therein. To make any desired number of copy sets the operator merely selects appropriate conventional switches to initiate the copying automatically. The web is repeatedly recirculatingly wound and unwound between the scrolls by the number of times corresponding to the number of copy sets desired. On each copying recirculation the entire series of documents is moved past the imaging area on the web and individually copied.

The copying is done here with line scanning or flowing light strip imaging system so as to provide document image movement in the same illustrated direction as the illustrated photoreceptor drum movement direction. To avoid a high speed rewind to rewind the drum back from one scroll onto the other scroll before each web copying run, bi-directional scanning may be provided by inserting an appropriate known optical system in the optics path to optically reverse the apparent scanning direction on alternate web direction movements.

A complete individual pre-collated copy set is produced from each recirculation of the web between the scrolls carrying the documents thereon, without requiring a collator or sorter. As previously described in the introduction, the operator may provide on-line stapling or other finishing either automatically or manually while the machine is continuing to make the subsequent copy sets automatically.

The documents are supported solely by the webs and do not need to contact any other structure during their recirculation and copying.

The extent or length of the reciprocal winding and unwinding of the web between the two scrolls will vary depending on the number of documents being copied, their dimensions, and the spacing which is provided between documents on the web. The machine logic may record the length of web utilized in loading the given number of documents, so that the web need only be recirculatingly driven by this length for each copy set.

Referring now in greater detail to the function and inter-relation of the second web 34 to the first web 32, it may be seen that the second web 34 combines with the first web 32 to provide an overlapping, commonly wound sandwich for positively retaining the documents between the two webs at all times in both scrolls 28 and 30. Furthermore, the two webs remain sandwiched together for retaining the documents without slippage as both webs unwind from the two scrolls, and for a substantial distance thereafter directly up to the edges of the minor central portion of the intermediate segment 36 at which the documents are imaged. In that imaging area, the document is retained and guided only on the single first web 32. However, immediately after passing through the imaging area, each document is recaptured or sandwiched again between the two webs, for transport to, and winding up in, the other scroll.

It is important to note that in spite of the fact that the document is retained by both webs at both sides of the imaging area, with the arrangement here the second web 34 does not cross over or pass through the imaging area or interfere with the document imaging in any way. The document is imaged totally unobstructed. Neither the image, or the illumination light for forming the images, passes through either of the webs. Thus, paper lint, scratches, wear marks or contaminants do not interfere in any way with the image or the illumination of the documents. This also eliminates any need for an elaborate cleaning or frequent replacement of either of the webs. These imaging advantages are known from the prior art, e.g., the U.S. Pat. Nos. 2,719,714 and 3,452,981, noted above teaching endless (non-scroll) document belts imaging opposite sides of documents at each side of an imaging area and retaining the document for imaging.

With the arrangement provided here, only a single second web 34 is required, and no additional web scrolls are required. The document is retained between two webs at both sides of the optical imaging area, yet also is retained and recirculated on one web at all times. This is accomplished with the web separating and guiding arrangement for the second web 34 provided here.

As the two webs commonly unwind from the right scroll 30, they travel together under tension to transport the document directly into the imaging area, until they reach the right side separating roller 46. The sandwiched wrapping and unwrapping of the documents between two webs tends to control buckling or slippage of the documents therefrom. It may be seen that this roller 46 slightly deforms or extends into the intermediate segment 36 between the plane of the scroll nips so as to assist in maintaining the desired tension on the webs. As the second web 34 reaches the separating roller 46 it sharply wraps around this roller by greater than 90° so as to avoid the optical path area. Here the web 34 makes an approximate 180° turn around the roller 46 and retraces its path backwards in a compact manner back around the scroll 30 and then up over and around the side of the two scrolls opposite from the imaging area and then around the left web scroll 28, by means of guide rollers 51, 50, 49, and 48. Thus, the web 34 reaches a left separating roller 45 without contacting or interfering in any way with the scrolls or the first web 32 and without ever crossing the area of the intermediate segment 36 or the optical path from the document through the lens 18 to the photoreceptor 20. The allochiral left separating roller 45 (in this direction of document movement) recombines the two webs 32 and 34 in a sandwich, forming a nip in which the lead edge of the document is captured after it passes through the imaging area. It may be seen that the only portion of the second web 34 here which is not commonly wound with the first web 32 is the open loop or bight around the scrolls from one edge of the imaging area to the other, i.e., from the roller 45 to the roller 46.

It may be seen that the two separating rollers 45 and 46 at opposite sides of the intermediate segment 36 are hollow and apertured, and contain therein stationary unapertured partial baffles or shields. This is to allow the interiors of these rollers 45 and 46 to be connected to appropriate air supply means within the body of the machine when the cassette is loaded therein. Thus, appropriate air pressure can be used to assist in the maintaining of the document at all times on the first web 32 and to prevent the documents from stripping off on the second web 34 when the webs are separated from one another at these rollers. However, it will be appreciated that with appropriately small radius rollers 45 and 46 that the sharp deformation of the second web 34 thereon, as opposed to the substantially linear path of the first web 32 past these rollers, provides a situation in which the beam strength of the documents will tend to keep the documents traveling linearly along the first web 34 and to allow the second web 34 to strip away from the documents, even without the use of an air pressure supply. The pneumatically porous nature of the rollers 45 and 46 allows air to enter between the roller and the document upon their separation to prevent the formation of a vacuum therebetween.

It will be appreciated that upon the insertion of the cassette unit 12 into the copying apparatus that a conventional mechanical interconnecton, through engagement with a frictional clutch, or gears, or the like will be provided to provide automatic mechanical recirculation winding and unwinding of the webs between one web scroll and the other for the automatic pre-collation copying of the documents.

As previously noted, the documents may be separately manually loaded into the cassette unit 12 at a location remote from the copying machine. For example, a cassette unit 12 may be placed on a secretary's desk and manually loaded by the secretary inserting documents onto the intermediate area 36 of the cassette unit, which is exposed when the cassette unit is removed from the copier. Meanwhile the copier can be running another cassette. The scrolls may be advanced by the hand wheel 42 as the document is loaded. Thus, the lead edge of the document will be captured in the nip between the two scrolls at either of the rollers 45 or 46, depending on the desired loading direction. A one-way clutch can, of course, be provided to require loading of documents in only one direction.

It will be appreciated that the web scrolls may be wound in the opposite direction, i.e., inside wound rather than outside wound. However, with that arrangement, and with the maintaining of the intermediate segment 36 of the first web in a generally planar orientation is desired, the position of the first web and the document in the imaging area would be in the upper portion of the cassette unit, further away from the optical system, particularly the illumination lamps 16, unless the lamps were inserted into the cassette upon the loading of the cassette unit into the copier or were an integral part of the cassette unit. Further, for ease in document loading it is desired to have the exposed intermediate segment 36 of the web onto which the documents are loaded as close as possible to the opening in the cassette unit.

While the arrangement illustrated here is preferred it will be appreciated that the same basic function could be provided with three separate webs, two for each main scroll, with the two extra webs winding and unwinding from their own separate scrolls. These two additional scrolls could be at the positions of the rollers 48 and 51, for example. However, the present arrangement of a single web connected in a loop without additional scrolls reduces the web material and space which would be required for the two additional web scrolls. Also eliminated by the present arrangement is any apparatus for maintaining the driving or tensioning of additional scrolls.

It may be seen that there has been disclosed herein an embodiment of a document handling system for a copying apparatus for making multiple pre-collated copy sheet sets with a high level of document protection and minimal document handling. While the embodiment disclosed herein is presently considered to be preferred, it will be appreciated that numerous modifications and improvements may be made therein without departing from the true spirit and scope of the invention. The following claims are intended to encompass all such modifications and improvements as fall within the spirit and scope of the invention.

What is claimed is:

1. In an automatic document handling system of a copying apparatus for making pre-collated copy sheet sets by repeated collated imaging of a set of original document sheets, the improvement comprising:
   an elongated windable document holding first web;
   means for forming a spaced pair of wound scrolls of said first web for winding up a set of otherwise unattached documents on said first web therein and retaining said documents between turns of said first web on both said web scrolls;
   said first web having a minor intermediate unwound segment extending between said web scrolls for transporting exposed documents between said web scrolls and onto which documents are insertable and removable;
   means for recirculatingly winding and unwinding said first web between one said web scroll and the other said web scroll to recirculating expose individual documents on said intermediate segment of said first web between said web scrolls in a pre-collated order;
   a second web commonly wound with said first web on at least one of said scrolls for retaining documents thereon wound between said first and second webs;
   optical imaging means for imaging documents on said intermediate segment of only said first web between said web scrolls for copying said documents; and
   separating means for separating said second web from said first web and guiding it away from said intermediate segment after said first and second webs have unwound from said scroll and before said first web passes through said intermediate segment so that said second web is not interposed between said optical imaging means and said intermediate segment of said first web.

2. The document handling system of claim 1, wherein said first and second web and said scrolls thereof comprise integral cassette means removable from and insertable in said copying apparatus and said optical imaging means thereof.

3. The document handling system of claim 1, wherein said intermediate segment normally extends generally planarly between said scrolls for said copying of documents thereon, and further including means for arcuately deforming said intermediate segment of said first web from said planar configuration to provide for automatic stripping of documents from said first web at said intermediate segment.

4. The document handling system of claim 1, wherein said scrolls are oppositely wound with said documents outside wound therein with the same direction of curvature.

5. The document handling system of claim 1, wherein said first web has a document transporting side and an opposite side and wherein said document transporting side is facing and adjacent to said optical imaging means, and wherein said intermediate segment of said first web defines a document retaining nip with each of said scrolls where said first web winds onto said scrolls, and wherein both of said scrolls are on said opposite side of said intermediate segment of said web and facing one another and wherein said intermediate segment normally extends generally planarly between said scrolls for said copying of documents thereon.

6. The document handling system of claim 1, wherein said second web is commonly wound on both said scrolls with said first web, and said separating means comprises web guide means for guiding said second web from one scroll at one side of said intermediate segment around said scrolls to the other scroll at the opposite side of said intermediate segment, without passing through the optical path to said intermediate segment from said optical imaging means, said web guide means causing said second web to wind on one scroll as it unwinds from the other scroll.

7. The document handling system of claim 6, wherein said web guide means maintains said first and second webs in overlying engagement up to said intermediate segment and then deflects said second web by more than 90° away from said first web at each side of said intermediate segment.

8. The document handling system of claim 1, wherein said second web defines an endless loop around both said scrolls from opposite sides of said intermediate segment of said first web.

9. The document handling system of claim 6, further including means for manually advancing said first and second webs for manual loading of documents therebetween.

10. The document handling system of claim 1, wherein said separating means comprises a pneumatically porous roller around which said second web is deformed.

* * * * *